US012719864B2

(12) United States Patent
Mulik et al.

(10) Patent No.: US 12,719,864 B2
(45) Date of Patent: Aug. 25, 2026

(54) MANAGING AND SECURING CLOUD COMPUTING TASKS FOR MULTIPLE TENANTS

(71) Applicant: Capital One Services, LLC, McLean, VA (US)

(72) Inventors: Pooja Mulik, Brambleton, VA (US); Suyog Parajuli, Chantilly, VA (US); Gita Antoinette Lourdes, Great Falls, VA (US); Nikhil Agarwal, Clarksburg, MD (US); Prasanth Jain, Fairfax, VA (US)

(73) Assignee: Capital One Services, LLC, McLean, VA (US)

( * ) Notice: Subject to any disclaimer, the term of this patent is extended or adjusted under 35 U.S.C. 154(b) by 234 days.

(21) Appl. No.: 18/063,884

(22) Filed: Dec. 9, 2022

(65) Prior Publication Data

US 2024/0195806 A1 Jun. 13, 2024

(51) Int. Cl.
*H04L 9/40* (2022.01)
*G06F 9/50* (2006.01)

(52) U.S. Cl.
CPC ........ *H04L 63/0876* (2013.01); *G06F 9/5072* (2013.01)

(58) Field of Classification Search
None
See application file for complete search history.

(56) References Cited

U.S. PATENT DOCUMENTS 11,018,991 B1 * 5/2021 Vishwakarma ....... H04L 47/225
2015/0304399 A1 * 10/2015 Kramer .................. H04L 67/10 709/202
2017/0097841 A1 * 4/2017 Chang ..................... H04L 67/10
2019/0286484 A1 * 9/2019 Meirosu ................ G06F 9/4887
2020/0004606 A1 * 1/2020 Yanchuleff .......... G06F 16/1734
2020/0026579 A1 * 1/2020 Bahramshahry ...... G06F 9/5077
2020/0341947 A1 * 10/2020 Aziz .................. H04L 63/0428
2021/0176266 A1 * 6/2021 Ramamurthy ........ G06F 9/5077
2021/0349753 A1 * 11/2021 Ou ........................ G06F 9/4856
2021/0367862 A1 * 11/2021 Jain ......................... G06N 7/01

(Continued)

OTHER PUBLICATIONS

Kent Ramchand, et al., "Enterprise adoption of cloud computing with application portfolio profiling and application portfolio assessment," Journal of Cloud Computing: Advances, Systems and Applications, vol. 10, No. 1 (2021), pp. 1-18.

*Primary Examiner* — Rupal Dharia
*Assistant Examiner* — Shadi H Kobrosli
(74) *Attorney, Agent, or Firm* — Harrity & Harrity, LLP

(57) ABSTRACT

In some implementations, a cloud management device may receive, from a user device, a configuration associated with a task for cloud computing. The cloud management device may input one or more properties, associated with the configuration, to a model that is trained on historical cloud computing task information. Accordingly, the cloud management device may receive, from the model, an indication of a selected cloud environment, from a plurality of possible cloud environments based on credentials associated with the user device. The cloud management device may generate instructions for the task based on the selected cloud environment and may trigger execution of the task by the selected cloud environment using the instructions.

20 Claims, 7 Drawing Sheets

(56) References Cited

U.S. PATENT DOCUMENTS

| | | | | |
|---|---|---|---|---|
| 2023/0185608 | A1* | 6/2023 | Poort | G06F 9/4881<br>709/224 |
| 2023/0186192 | A1* | 6/2023 | Xia | G06Q 10/06311<br>705/7.14 |
| 2023/0259401 | A1* | 8/2023 | Zorin | G06F 9/4881<br>718/104 |
| 2024/0007463 | A1* | 1/2024 | Gormley | H04L 63/0853 |
| 2024/0362472 | A1* | 10/2024 | Fu | G06N 3/0464 |

* cited by examiner

300

MANAGING AND SECURING CLOUD COMPUTING TASKS FOR MULTIPLE TENANTS

BACKGROUND

Cloud computing continues to grow in popularity, and there are multiple providers of cloud computing resources, each offering multiple cloud computing environments. A cloud computing environment may include an operating system and/or other computer applications hosted remotely from a user. The user accesses the computer applications using a network.

SUMMARY

Some implementations described herein relate to a system for cloud computing task management. The system may include one or more memories and one or more processors communicatively coupled to the one or more memories. The one or more processors may be configured to receive, from a first user device, a first configuration associated with a first task for cloud computing. The one or more processors may be configured to input one or more first properties, associated with the first configuration, to a model, wherein the model is trained on historical cloud computing task information. The one or more processors may be configured to receive, from the model, an indication of a first selected cloud environment, from a first plurality of possible cloud environments based on credentials associated with the first user device. The one or more processors may be configured to generate first instructions for the first task based on the first selected cloud environment. The one or more processors may be configured to trigger execution of the first task by the first selected cloud environment using the first instructions. The one or more processors may be configured to receive, from a second user device, a second configuration associated with a second task for cloud computing. The one or more processors may be configured to input one or more second properties, associated with the second configuration, to the model trained on historical cloud computing task information. The one or more processors may be configured to receive, from the model, an indication of a second selected cloud environment, from a second plurality of possible cloud environments based on credentials associated with the second user device. The one or more processors may be configured to generate second instructions for the second task based on the second selected cloud environment. The one or more processors may be configured to trigger execution of the second task by the second selected cloud environment using the second instructions.

Some implementations described herein relate to a method of cloud computing task management. The method may include receiving, from a user device, a configuration associated with a task for cloud computing. The method may include inputting one or more properties, associated with the configuration, to a model, wherein the model is trained on historical cloud computing task information. The method may include receiving, from the model, an indication of a selected cloud environment, from a plurality of possible cloud environments based on credentials associated with the user device. The method may include generating instructions for the task based on the selected cloud environment. The method may include triggering execution of the task by the selected cloud environment using the instructions.

Some implementations described herein relate to a non-transitory computer-readable medium that stores a set of instructions for cloud computing task management for a device. The set of instructions, when executed by one or more processors of the device, may cause the device to receive, from a first user device, a first configuration associated with a first task for cloud computing. The set of instructions, when executed by one or more processors of the device, may cause the device to determine a first selected cloud environment. The set of instructions, when executed by one or more processors of the device, may cause the device to generate first instructions for the first task based on the first selected cloud environment. The set of instructions, when executed by one or more processors of the device, may cause the device to trigger execution of the first task by the first selected cloud environment using the first instructions. The set of instructions, when executed by one or more processors of the device, may cause the device to receive, from a second user device, a second configuration associated with a second task for cloud computing. The set of instructions, when executed by one or more processors of the device, may cause the device to determine a second selected cloud environment, wherein the second selected cloud environment comprises a distributed computing platform executed on a single node. The set of instructions, when executed by one or more processors of the device, may cause the device to generate second instructions for the second task based on the second selected cloud environment. The set of instructions, when executed by one or more processors of the device, may cause the device to trigger execution of the second task by the second selected cloud environment using the second instructions.

DETAILED DESCRIPTION

Figure 1A:
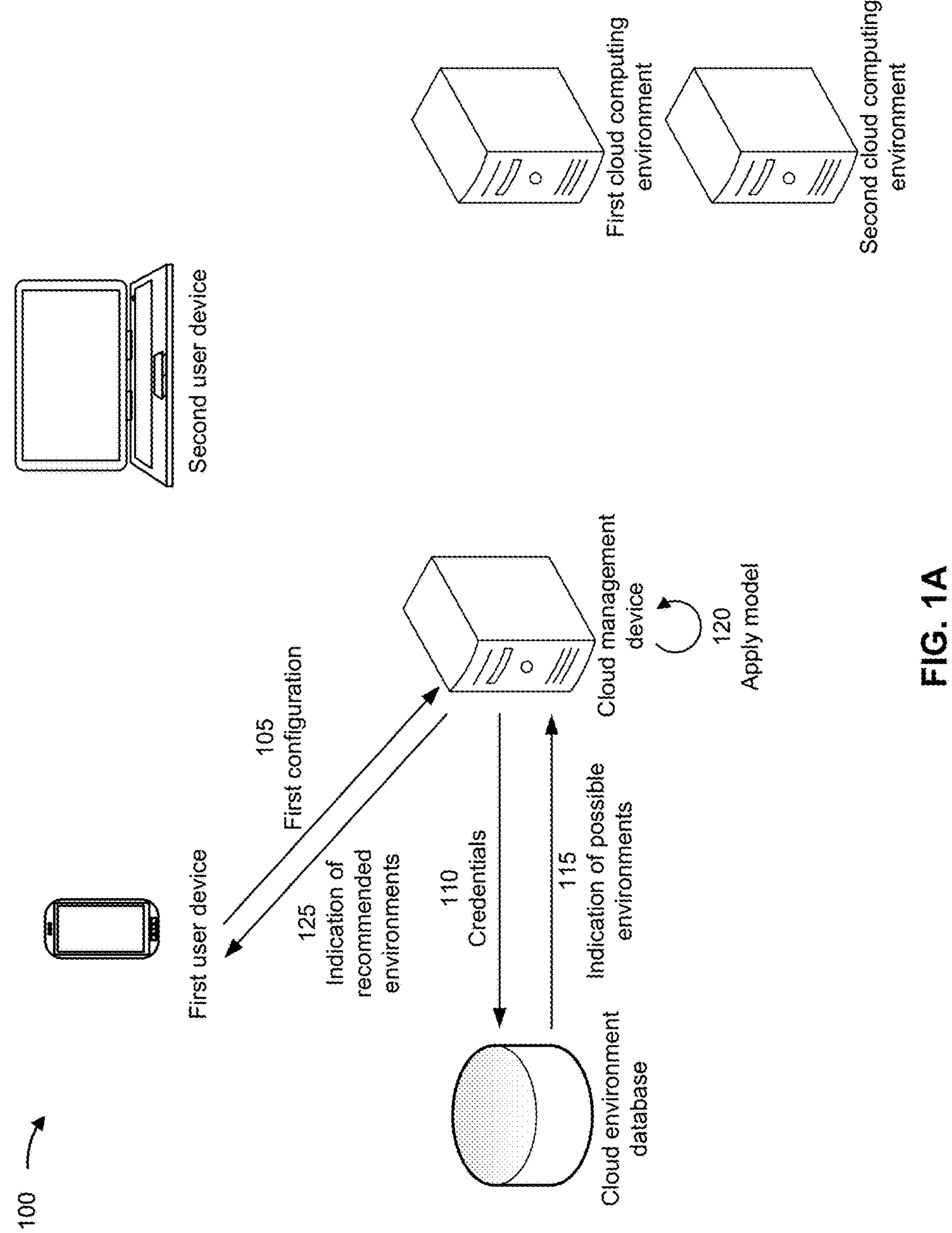
FIGS. 1A-1D are diagrams of an example implementation relating to managing and securing cloud computing tasks for multiple tenants, in accordance with some embodiments of the present disclosure.

The following detailed description of example implementations refers to the accompanying drawings. The same reference numbers in different drawings may identify the same or similar elements.

Some tasks are particularly suitable for execution in a cloud environment. A "task" may refer to a computational process for a computer (e.g., execution of a model, sorting and classification of a data set, or migration of a database to another data structure, among other examples). A task may include multiple computational processes that are all logically grouped in a same job. For example, a user may write a configuration file (or another data structure including task instructions) that instructs a cloud environment to perform a job that includes a series of computational processes.

Tasks associated with large data sets are often more efficient to execute in virtual environments rather than on local machines. In another example, tasks associated with large computational power are often more efficient to execute on distributed computing networks rather than on local machines. There are multiple providers of cloud computing resources. For example, Amazon® provides Elastic Compute Cloud (EC2®) and Elastic Kubernetes Service (EKS), among other examples. Similarly, Google® provides the Google Compute Engine (GCE) and the Google Cloud Dataproc. Microsoft© offers Azure® Virtual Machines and Azure Data Lake Analytics.

Cloud computing is remote, which allows a user to prevent slowdown of a local environment (e.g., local computing on a user device) or an edge environment (e.g., edge computing on an edge device). Local task management is generally performed by an operating system that is aware of what local hardware is available and how to schedule tasks across the local hardware. Edge task management is generally performed by an edge service that is aware of what edge serves are available and how to schedule tasks across the edge services. Task management in a single cloud environment is similar to local task management. However, task management between cloud environments is performed remotely over a network, which reduces awareness of how to optimally use hardware and software provided by cloud environments. For example, when a user assigns a task to a suboptimal cloud environment, the user may waste processing resources and power on the assigned cloud environment.

Some implementations described herein provide for a model, trained on historical cloud computing task information, to recommend cloud environments for execution of cloud computing tasks. Accordingly, the model may conserve processing resources and power on cloud environments by selecting cloud environments based on cost (e.g., processing resource and electric costs). Additionally, users experience increased accuracy and reduced latency because the model selects cloud environments suited to the cloud computing tasks.

Furthermore, task management between cloud environments is usually performed by individual users. This ensures that each user's credentials and tasks are securely separated; however, inaccuracies in selecting cloud environments suited to the cloud computing tasks may be increased because each user's tasks are managed separately.

Some implementations described herein provide for the model to be implemented in a multi-tenant management suite. For example, some implementations described herein provide for selecting from different sets of possible cloud environments for different users based on each user's credentials. Accordingly, each user's credentials may be stored securely, and each cloud computing task for a user may be isolated from other cloud computing tasks associated with other users. As a result, multiple users may be accommodated on a same service (e.g., using the model) without sacrificing security.

FIGS. 1A-1D are diagrams of an example 100 associated with managing and securing cloud computing tasks for multiple tenants. As shown in FIGS. 1A-1D, example 100 includes a cloud management device, a cloud environment database (e.g., implemented in a data store or another similar type of device), one or more user devices, and one or more cloud computing environments. These devices are described in more detail in connection with FIGS. 2 and 3.

As shown in FIG. 1A and by reference number 105, a first user device may transmit, and the cloud management device may receive, a first configuration associated with a first task for cloud computing. In some implementations, the first configuration may include a package of code associated with the first task and an indication of dependencies (e.g., one or more dependencies) associated with the first task. For example, the configuration may comprise a YAML ain't markup language (YAML) file (e.g., one or more YAML files), a Python script (e.g., one or more Python scripts), a service configuration file (one or more .cscfg files), a shell script (e.g., one or more .sh files), a configuration file (e.g., one or more .conf files), or a properties list (e.g., one or more .properties files), among other examples.

The first user device may use an application programming interface (API) associated with the cloud management device to submit the first configuration. For example, a first user of the first user device may access a shell (also referred to as a "command prompt") and enter commands to the shell in order to submit the first configuration as a parameter during a call to the API.

In some implementations, the first user device and the cloud management device may establish a secure connection such that the first configuration is received using the secure connection. For example, the first user device and the cloud management device may establish a transport layer security (TLS) connection and/or another type of encrypted connection in order to securely transfer the first configuration. In some implementations, the cloud management device may establish credentials (e.g., one or more credentials, such as a username and password, a personal identification number (PIN), a certificate, and/or another type of authenticating information) for the first user device that are associated with the cloud management device. Accordingly, the secure connection may be established based on the credentials associated with the cloud management device.

In some implementations, the cloud management device may establish the credentials for the first user device during a registration procedure. For example, the first user device may transmit, and the cloud management device may receive, a first registration message. The first user device may also transmit (with, or after, the first registration message) a set of credentials associated with the first user device. For example, the set of credentials may be associated with a corresponding set of cloud computing environments to which the first user device has access.

In some implementations, the cloud management device may securely store the set of credentials (e.g., based on the credentials for the first user device) in the cloud environment database. The cloud environment database may be local to the cloud management device. Alternatively, the cloud environment database may be implemented at least partially separately (e.g., virtually, logically, and/or physically) from the cloud management device.

Accordingly, as shown by reference number 110, the cloud management device may use the credentials for the first user device to query the cloud environment database. Additionally, or alternatively, the cloud management device may use an identifier (e.g., a username, an email, a natural name, a machine name, an Internet protocol (IP) address, a medium access control (MAC) address, and/or another type of identifying information) associated with the first user to query the cloud environment database. The cloud environment database may return, and the cloud management device may receive, an indication of possible cloud environments (e.g., a set of possible cloud environments) associated with the first user device, as shown by reference number 115.

A "possible" cloud environment is a cloud environment to which the first user device has access. For example, the remote server may exclude, from the set of possible cloud environments, any cloud environments to which the first user device does not have access (e.g., any cloud environments with which the first user does not have an account and/or a subscription). Accordingly, the possible cloud environments may be the corresponding set of cloud computing environments to which the first user device has access. The cloud management device may use the set of credentials (e.g., received during registration) when selecting a cloud computing environment (e.g., from the set of possible cloud environments) for the first task. Additionally, in some implementations, a "possible" cloud environment may be a cloud environment suitable for a task. For example, when the task includes a machine learning model training or execution, the remote server may exclude, from the set of possible cloud environments, any cloud environments that are indicated (e.g., in the cloud environment database) as intended for data storage. In another example, when the task includes a database sorting or migration, the remote server may exclude, from the set of possible cloud environments, any cloud environments that are indicated (e.g., in the cloud environment database) as intended for distributed computation.

As shown by reference number 120, the cloud management device may apply a model trained on historical cloud computing task information. For example, the cloud management device may input first properties (e.g., one or more first properties) associated with the first task to the model and receive an indication of a recommended cloud environment (e.g., one or more recommended cloud environments) from the model.

In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical cloud computing task information). For example, for a regression algorithm, a model parameter may include a regression coefficient (e.g., a weight). For a decision tree algorithm, a model parameter may include a decision tree split location, as an example.

Additionally, the cloud management device may use one or more hyperparameter sets to tune the model. A hyperparameter may include a structural parameter that controls execution of a machine learning algorithm by the cloud management device, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

The first properties associated with the first task (e.g., and determined from the first configuration) may include a data size associated with the first task, a computation speed associated with the first task, a programming language associated with the first task, and/or a type of virtualization associated with the first task, among other examples. For example, the model may select different cloud environments for inputs having larger data sizes (e.g., larger images, larger text files or other unstructured data sets, larger tables or other structured data sets, or other types of data inputs satisfying a size threshold) as compared with inputs having smaller data sizes (e.g., failing to satisfy the size threshold). Additionally, or alternatively, the model may select different cloud environments for tasks associated with more computational speed (e.g., including additional multiply-and-accumulate functions or otherwise using computational resources that satisfy a computation threshold) as compared with tasks associated with less computational speed (e.g., including fewer multiply-and-accumulate functions or otherwise using computational resources that fails to satisfy the computation threshold). Additionally, or alternatively, the model may select different cloud environments for tasks associated with code packages in one programming language as compared with tasks associated with code packages in a different programming language. Additionally, or alternatively, the model may select different cloud environments for tasks associated with one type of virtualization (e.g., containerization) as compared with tasks associated with a different type of virtualization (e.g., emulation).

The historical cloud computing task information may include a plurality of costs associated with a plurality of tasks. For example, the historical cloud computing task information may include properties associated with a plurality of tasks that were executed on cloud environments stored in association with identifiers of the cloud environments and costs associated with executions of the tasks. The costs may include processing costs (e.g., an amount of calculations over time), time costs (e.g., an execution time), energy costs (e.g., an estimated amount of electricity consumed), and/or other types of costs. Accordingly, the model may be trained to minimize (at least locally) a cost associated with a cloud computing task based on properties associated with the task.

In some implementations, the historical cloud computing task information may include task information from a preconfigured duration (e.g., one hour, one day, one week, or one year, among other examples). For example, after a previous duration has passed, the remote server may replace the original historical cloud computing task information (which served as a previous set of training data) with cloud computing task information from a most recent duration. Accordingly, the remote server may re-train the model on newer data after the duration has passed in order to keep the historical cloud computing task information from growing indefinitely. Alternatively, the remote server may use each duration of cloud computing task information as a new test set. Accordingly, the remote server may refine the model on newer data after the duration has passed without deleting the original historical cloud computing task information. Similarity, the historical cloud computing task information may include task information that satisfies an age threshold (e.g., after real-time execution of tasks, one hour old, one day old, one week old, or one year old, among other examples). For example, the remote server may add only information that is sufficiently old to the historical cloud computing task information.

In some implementations, the model may be trained on historical cloud computing task information associated with the first user. Accordingly, the cloud management device may apply different models for different users. Additionally, in some implementations, the model may be trained on anonymized historical cloud computing task information associated with a plurality of users. Accordingly, the cloud management device may still apply different models for different users, where each model is trained at least in part on the anonymized historical cloud computing task information. Alternatively, the cloud management device may apply a same model, trained on the anonymized historical cloud computing task information, across users.

In some implementations, the model may output a selected cloud environment such that the cloud management device proceeds to operations described in connection with reference number 135. Alternatively, as shown by reference number 125, the cloud management device may transmit, and the first user device may receive, an indication of a set of recommended cloud environments (e.g., output by the model). In some implementations, the set of recommended cloud environments may be ranked. For example, the model may output a corresponding score associated with each recommended cloud environment, and the cloud management device may indicate the set of recommended cloud environments in an order according to the corresponding scores.

Figure 1B:
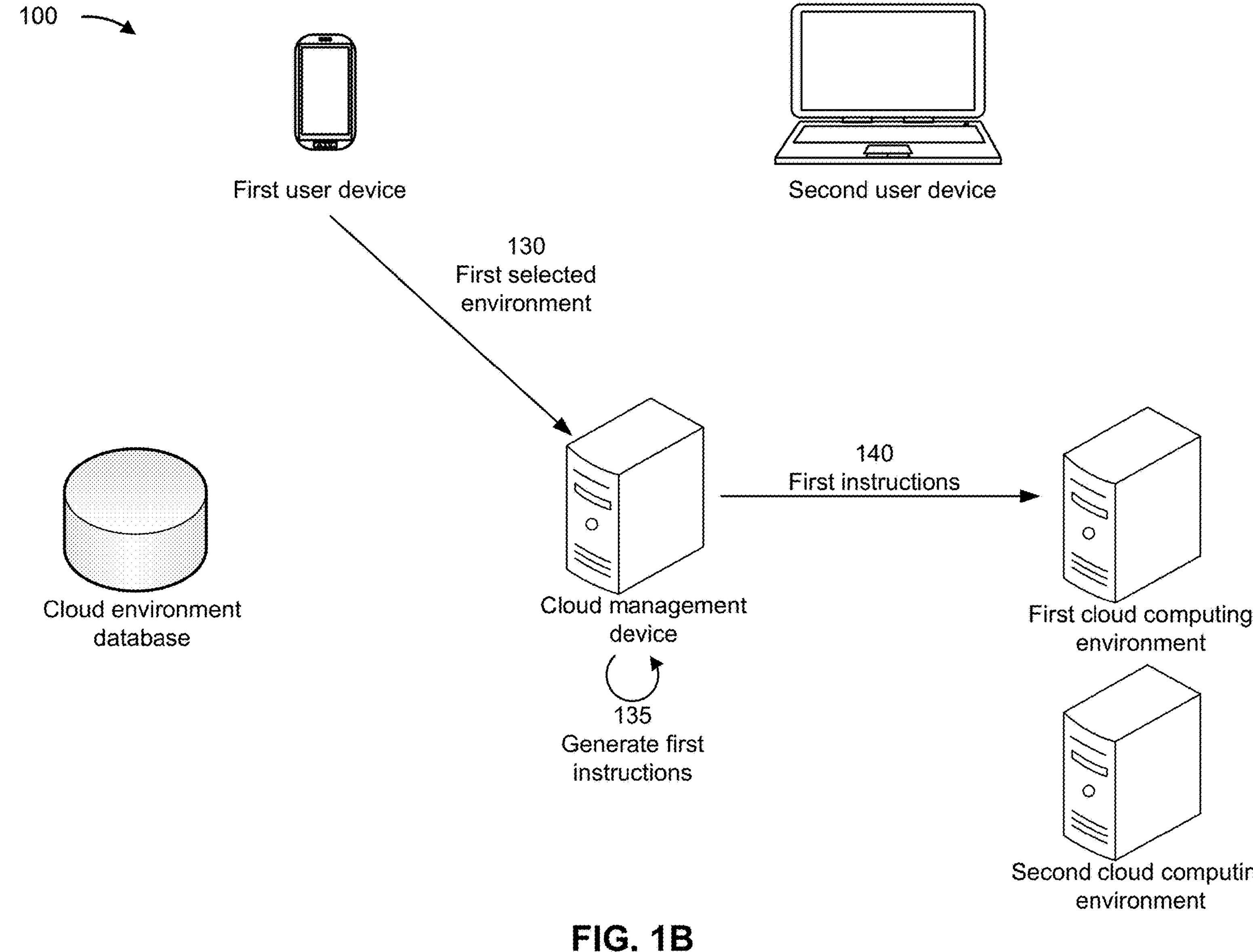

Accordingly, as shown in FIG. 1B and by reference number 130, the first user device may transmit, and the cloud management device may receive, an indication of the selected cloud environment from the set of recommended cloud environments. For example, the first user of the first user device may access a shell and enter a command to the shell in order to submit the indication of the selected cloud environment to the cloud management device.

As shown by reference number 135, the cloud management device may generate first instructions for the first task based on the selected cloud environment. For example, the first instructions may include configuration files (e.g., one or more configuration files) identifying the package of code and the dependencies associated with the first configuration.

In some implementations, the selected cloud environment may include a distributed computing platform executed on a single node. For example, the selected cloud environment may include a single machine Apache® Spark setup. Accordingly, the cloud management device may generate the first instructions with a field (e.g., at least one field associated with additional nodes or machines) including a null value.

Further, as shown by reference number 140, the cloud management device may trigger execution of the first task by the selected cloud environment using the first instructions. For example, the cloud management device may transmit the first instructions to the selected cloud environment (shown as the "first cloud computing environment" in FIG. 1B). In some implementations, the cloud management device may transmit (with, or before, the first instructions) credentials (e.g., from the set of credentials provided during a registration procedure, as described above), associated with the first user device and associated with the selected cloud environment, to the selected cloud environment. Accordingly, the execution of the first task may be kept securely separated from other tasks in the selected cloud environment.

In some implementations, the cloud management device may additionally transmit, and the first user device may receive, a status indication (e.g., one or more status indications) associated with execution of the first task. For example, the cloud management device may pass status updates from the selected cloud environment to the first user device. Additionally, or alternatively, the selected cloud environment may transmit status updates directly to the first user device (e.g., based on the credentials associated with the first user device and associated with the selected cloud environment). For example, the first task may be executed in associated with an account on the selected cloud environment for the first user such that the selected cloud environment transmits status updates to the first user device based on a setting associated with the account.

Figure 1C:
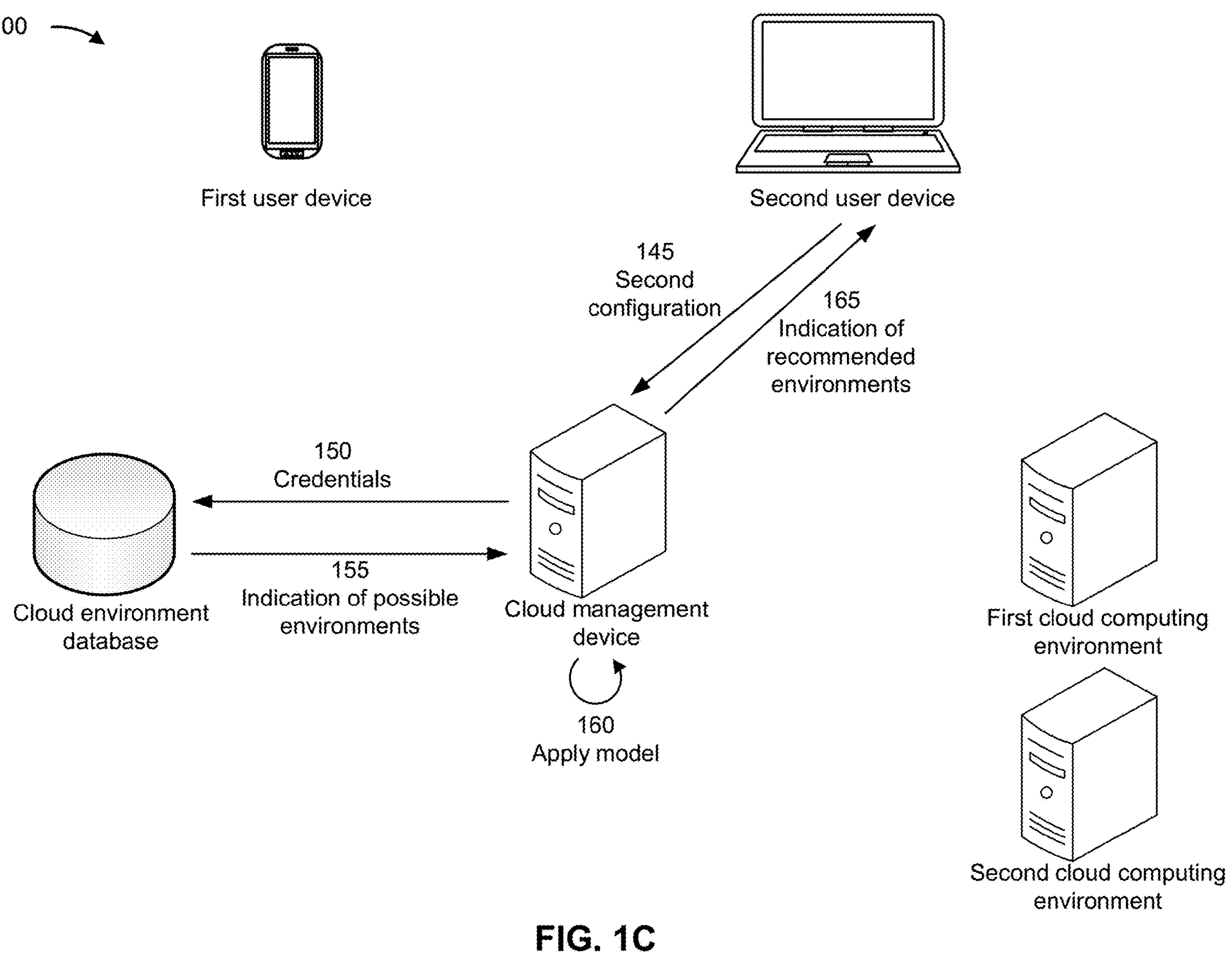

Because the cloud management device is a multi-tenant system, the cloud management device may further receive, from a second user device, a second configuration associated with a second task for cloud computing, as shown in FIG. 1C and by reference number 145. In some implementations, the second configuration may include a package of code associated with the second task and an indication of dependencies (e.g., one or more dependencies) associated with the second task. The second user device may use the API associated with the cloud management device to submit the second configuration. For example, a second user of the second user device may access a shell and enter commands to the shell in order to submit the second configuration as a parameter during a call to the API.

In some implementations, the second user device and the cloud management device may establish a secure connection such that the second configuration is received using the secure connection. For example, the second user device and the cloud management device may establish a TLS connection and/or another type of encrypted connection in order to securely transfer the second configuration. In some implementations, the cloud management device may establish credentials (e.g., one or more credentials, such as a username and password, a PIN, a certificate, and/or another type of authenticating information) for the second user device that are associated with the cloud management device. Accordingly, the secure connection may be established based on the credentials associated with the cloud management device.

The cloud management device may store the second configuration in a second storage (e.g., a physical and/or virtual portion of a memory) that is separate from a first storage storing the first configuration, described above. Accordingly, the cloud management securely manages cloud computing configurations from multiple users. Additionally, the secure connection between the second user device and the cloud management device may be separate from the secure connection the first user device and the cloud management device, described above. For example, the cloud management system may use a key, certificate, and/or another type of data to establish the secure connection with the second user device that is different than a key, certificate, and/or another type of data to establish the secure connection with the first user device. Accordingly, the cloud management securely receives commands from multiple users.

In some implementations, the cloud management device may establish the credentials for the second user device during a registration procedure, similarly as described above in connection with the first user device. In some implementations, the cloud management device may securely store a set of credentials, associated with a corresponding set of cloud computing environments to which the second user device has access, in the cloud environment database.

Accordingly, as shown by reference number 150, the cloud management device may use the credentials for the second user device to query the cloud environment database. Additionally, or alternatively, the cloud management device may use an identifier (e.g., a username, an email, a natural name, a machine name, an IP address, a MAC address, and/or another type of identifying information) associated with the second user to query the cloud environment database. The cloud environment database may return, and the cloud management device may receive, an indication of possible cloud environments (e.g., a set of possible cloud environments) associated with the second user device, as shown by reference number 155. The possible cloud environments may be the corresponding set of cloud computing environments to which the second user device has access. Accordingly, the cloud management device may use the set of credentials (e.g., received during registration) when selecting a cloud computing environment (e.g., from the set of possible cloud environments) for the second task.

As shown by reference number 160, the cloud management device may apply a model trained on historical cloud computing task information. For example, the cloud management device may input second properties (e.g., one or more second properties) associated with the second task to the model and receive an indication a recommended cloud environment (e.g., one or more recommended cloud environments) from the model. The second properties may be similar to the first properties described above.

In some implementations, the model may be trained on historical cloud computing task information associated with the second user. Accordingly, the cloud management device may apply different models for different users. Additionally, in some implementations, the model may be trained on anonymized historical cloud computing task information associated with a plurality of users. Accordingly, the cloud management device may still apply different models for different users, where each model is trained at least in part on the anonymized historical cloud computing task information. Alternatively, the cloud management device may apply a same model, trained on the anonymized historical cloud computing task information, across users. For example, the model applied for the second task may be the same model as applied for the first task, as described above in connection with reference number 120.

In some implementations, the model may output a selected cloud environment such that the cloud management device proceeds to operations described in connection with reference number 175. Alternatively, as shown by reference number 165, the cloud management device may transmit, and the second user device may receive, an indication of a set of recommended cloud environments (e.g., output by the model). In some implementations, the set of recommended cloud environments may be ranked. For example, the model may output a corresponding score associated with each recommended cloud environment, and the cloud management device may indicate the set of recommended cloud environments in an order according to the corresponding scores.

Figure 1D:
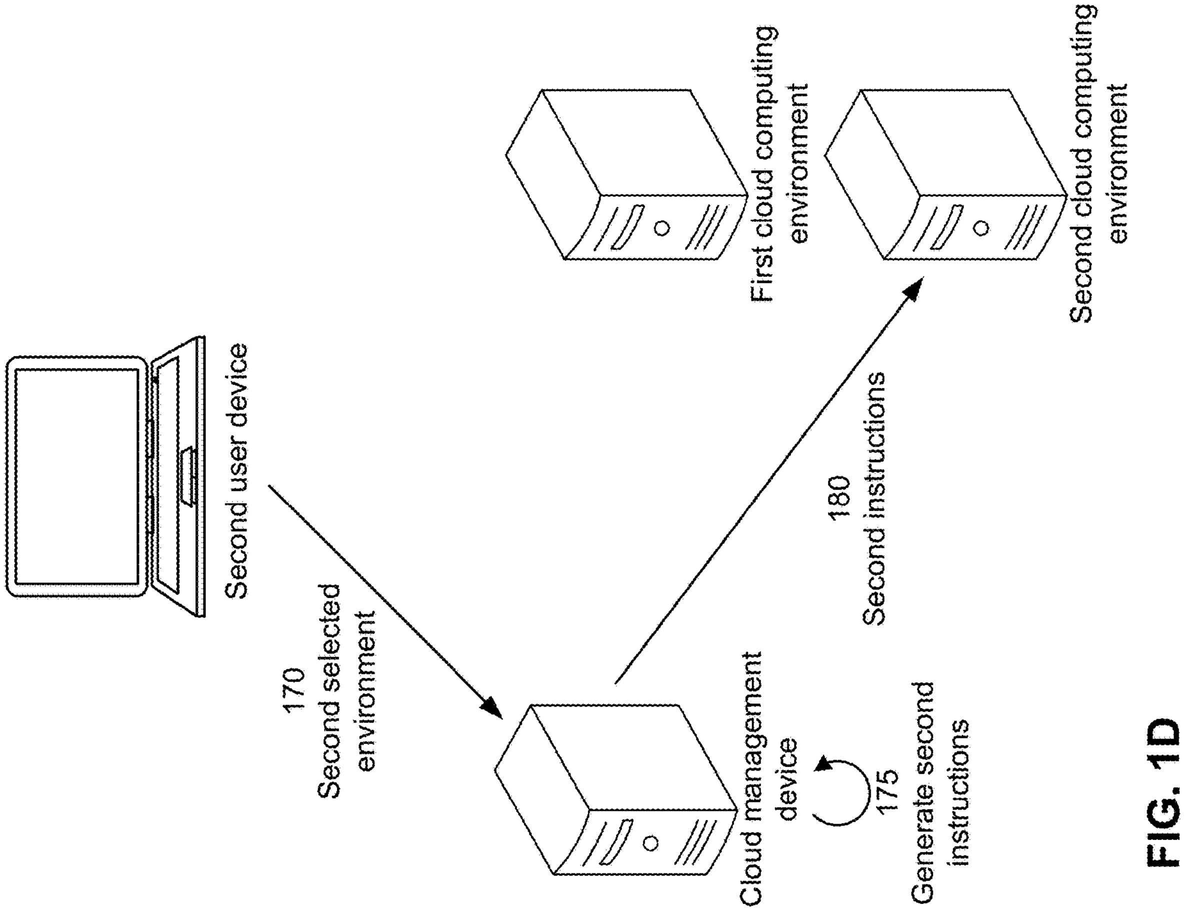
Figure 1D:
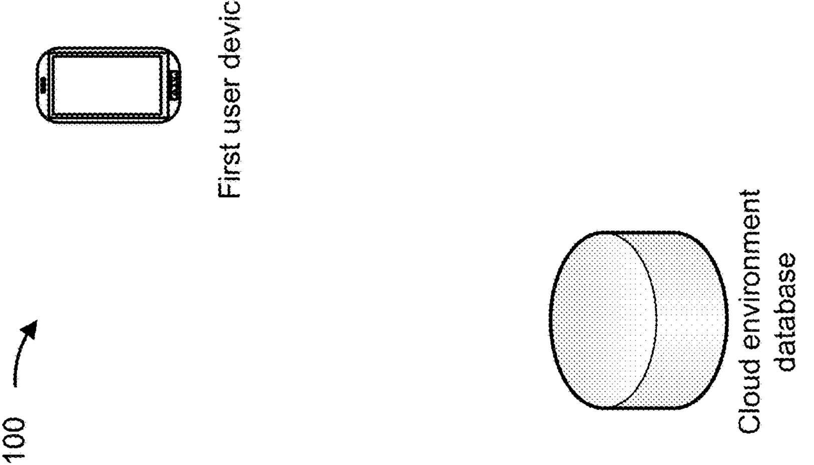

Accordingly, as shown in FIG. 1D and by reference number 170, the second user device may transmit, and the cloud management device may receive, an indication of the selected cloud environment from the set of recommended cloud environments. For example, the second user of the second user device may access a shell and enter a command to the shell in order to submit the indication of the selected cloud environment to the cloud management device.

As shown by reference number 175, the cloud management device may generate second instructions for the second task based on the selected cloud environment. For example, the second instructions may include configuration files (e.g., one or more configuration files) identifying the package of code and the dependencies associated with the second configuration.

In some implementations, the selected cloud environment may include a distributed computing platform executed on a single node. For example, the selected cloud environment may include a single machine Apache® Spark setup. Accordingly, the cloud management device may generate the second instructions with a field (e.g., at least one field associated with additional nodes or machines) including a null value.

The cloud management device may store the second instructions in a second storage (e.g., a physical and/or virtual portion of a memory) that is separate from a first storage storing the first instructions, described above. Accordingly, the cloud management securely generates cloud computing instructions for multiple users.

Further, as shown by reference number 180, the cloud management device may trigger execution of the second task by the selected cloud environment using the second instructions. For example, the cloud management device may transmit the second instructions to the selected cloud environment (shown as the "second cloud computing environment" in FIG. 1D). In some implementations, the cloud management device may transmit (with, or before, the second instructions) credentials (e.g., from the set of credentials provided during a registration procedure, as described above), associated with the second user device and associated with the selected cloud environment, to the selected cloud environment. Accordingly, the execution of the second task may be kept securely separated from other tasks in the selected cloud environment.

In some implementations, the cloud management device may additionally transmit, and the second user device may receive, a status indication (e.g., one or more status indications) associated with execution of the second task. For example, the cloud management device may pass status updates from the selected cloud environment to the second user device. Additionally, or alternatively, the selected cloud environment may transmit status updates directly to the second user device (e.g., based on the credentials associated with the second user device and associated with the selected cloud environment). For example, the second task may be executed in associated with an account on the selected cloud environment for the second user such that the selected cloud environment transmits status updates to the second user device based on a setting associated with the account.

By using techniques as described in connection with FIGS. 1A-1D, the cloud management device may apply the model, trained on historical cloud computing task information, to recommend cloud environments for execution of the first and second tasks. Accordingly, the model may conserve processing resources and power on the selected cloud based on cost. Additionally, the first and second users experience increased accuracy and reduced latency because the model selects cloud environments suited to the first and second tasks, respectively.

As indicated above, FIGS. 1A-1D are provided as an example. Other examples may differ from what is described with regard to FIGS. 1A-1D.

Figure 2:
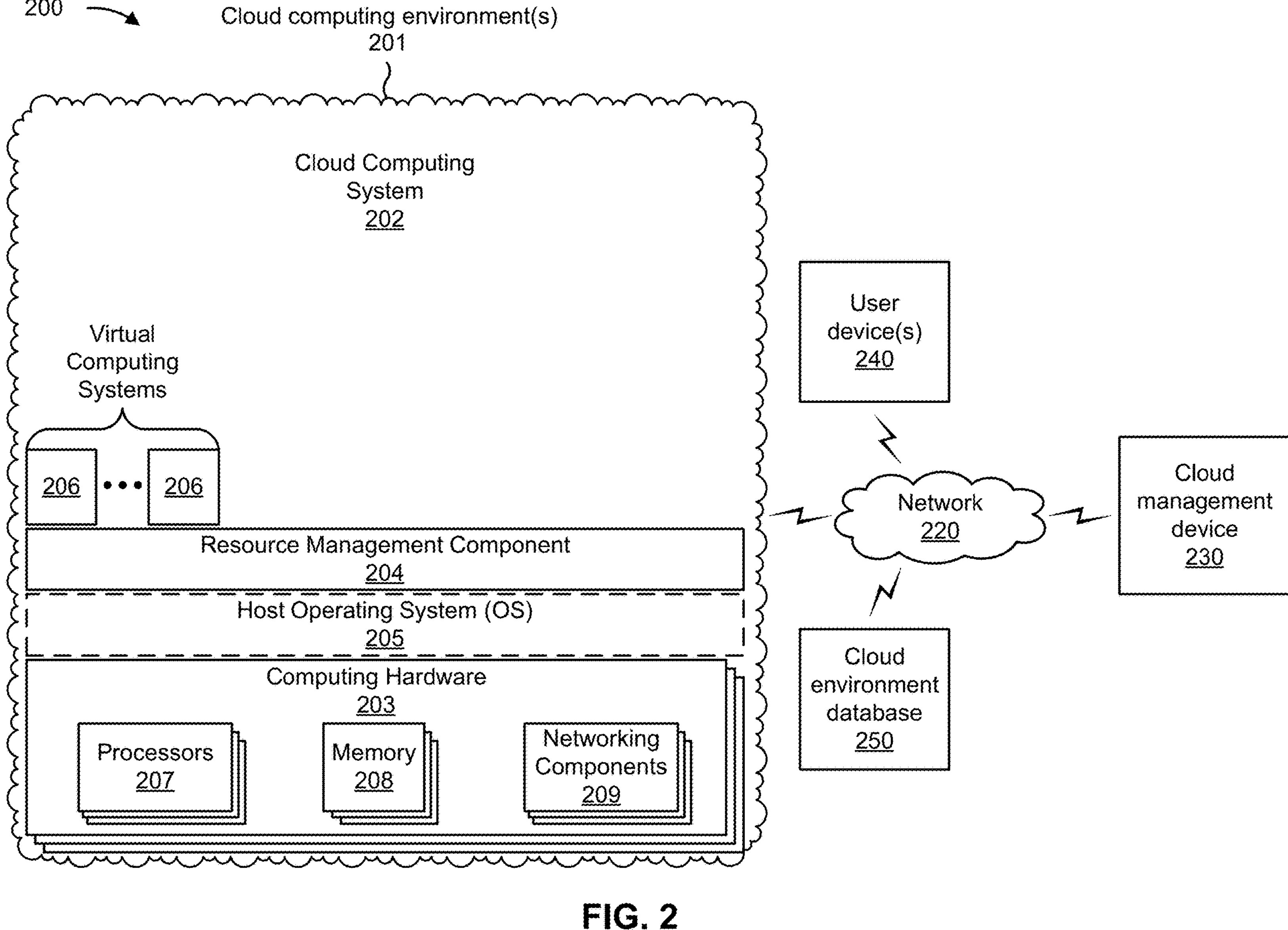
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include one or more cloud computing environments 201, which may include one or more elements of and/or may execute within a cloud computing system 202. The cloud computing system 202 may include one or more elements 203-209, as described in more detail below. As further shown in FIG. 2, environment 200 may include a network 220, a cloud management device 230, one or more user devices 240, and/or a device implementing a cloud environment database 250. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines. Additionally, or alternatively, the resource management component 204 may include a container manager, such as when the virtual computing systems 206 are containers. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine, a container, or a hybrid environment that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the cloud computing environment(s) 201 may include one or more elements 203-209 of the cloud computing system 202, may execute within the cloud computing system 202, and/or may be hosted within the cloud computing system 202, in some implementations, the cloud computing environment(s) 201 may not be cloud-based (e.g., may be implemented outside of a cloud computing system) or may be partially cloud-based. For example, the cloud computing environment(s) 201 may include one or more devices that are not part of the cloud computing system 202, such as device 300 of FIG. 3, which may include a standalone server or another type of computing device. The cloud computing environment(s) 201 may perform one or more operations and/or processes described in more detail elsewhere herein.

Network 220 may include one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The cloud management device 230 may include one or more devices capable of receiving, generating, storing, processing, providing, and/or routing information associated with cloud computing tasks, as described elsewhere herein. The cloud management device 230 may include a communication device and/or a computing device. For example, the cloud management device 230 may include a server, such as an application server, a client server, a web server, a database server, a host server, a proxy server, a virtual server (e.g., executing on computing hardware), or a server in a cloud computing system. In some implementations, the cloud management device may include computing hardware used in a cloud computing environment.

The user device(s) 240 may include one or more devices capable of receiving, generating, storing, processing, and/or providing information associated with cloud computing tasks, as described elsewhere herein. The user device(s) 240 may include a communication device and/or a computing device. For example, the user device(s) 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The cloud environment database 250 may be implemented on one or more devices capable of receiving, generating, storing, processing, and/or providing information associated with cloud computing tasks, as described elsewhere herein. The database 250 may be implemented on communication devices and/or computing devices. For example, the database 250 may be implemented on servers, database servers, application servers, client servers, web servers, host servers, proxy servers, virtual servers (e.g., executing on computing hardware), servers in a cloud computing system, devices that include computing hardware used in a cloud computing environment, or similar types of devices.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
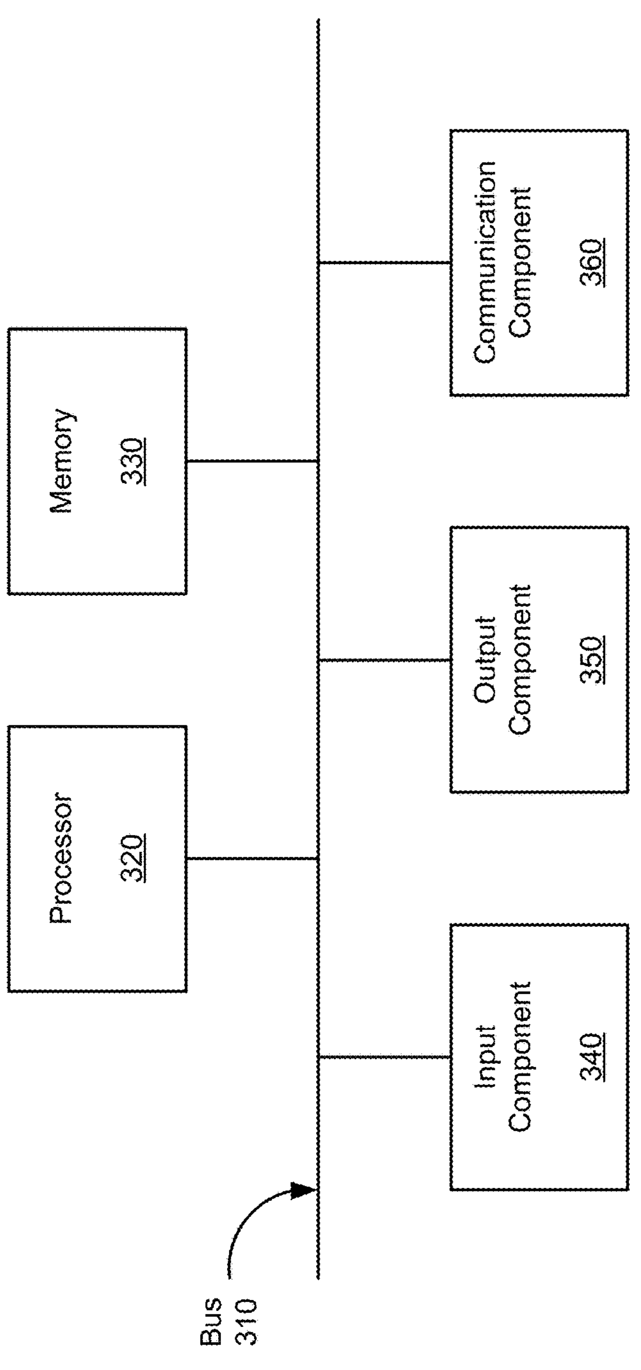
FIG. 3 is a diagram of example components of one or more devices of FIG. 2, in accordance with some embodiments of the present disclosure.

FIG. 3 is a diagram of example components of a device 300 associated with managing and securing cloud computing tasks for multiple tenants. Device 300 may correspond to a user device, a cloud management device, and/or a device implementing a cloud environment database. In some implementations, the user device, the cloud management device, and/or the device implementing a cloud environment database may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 may be implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
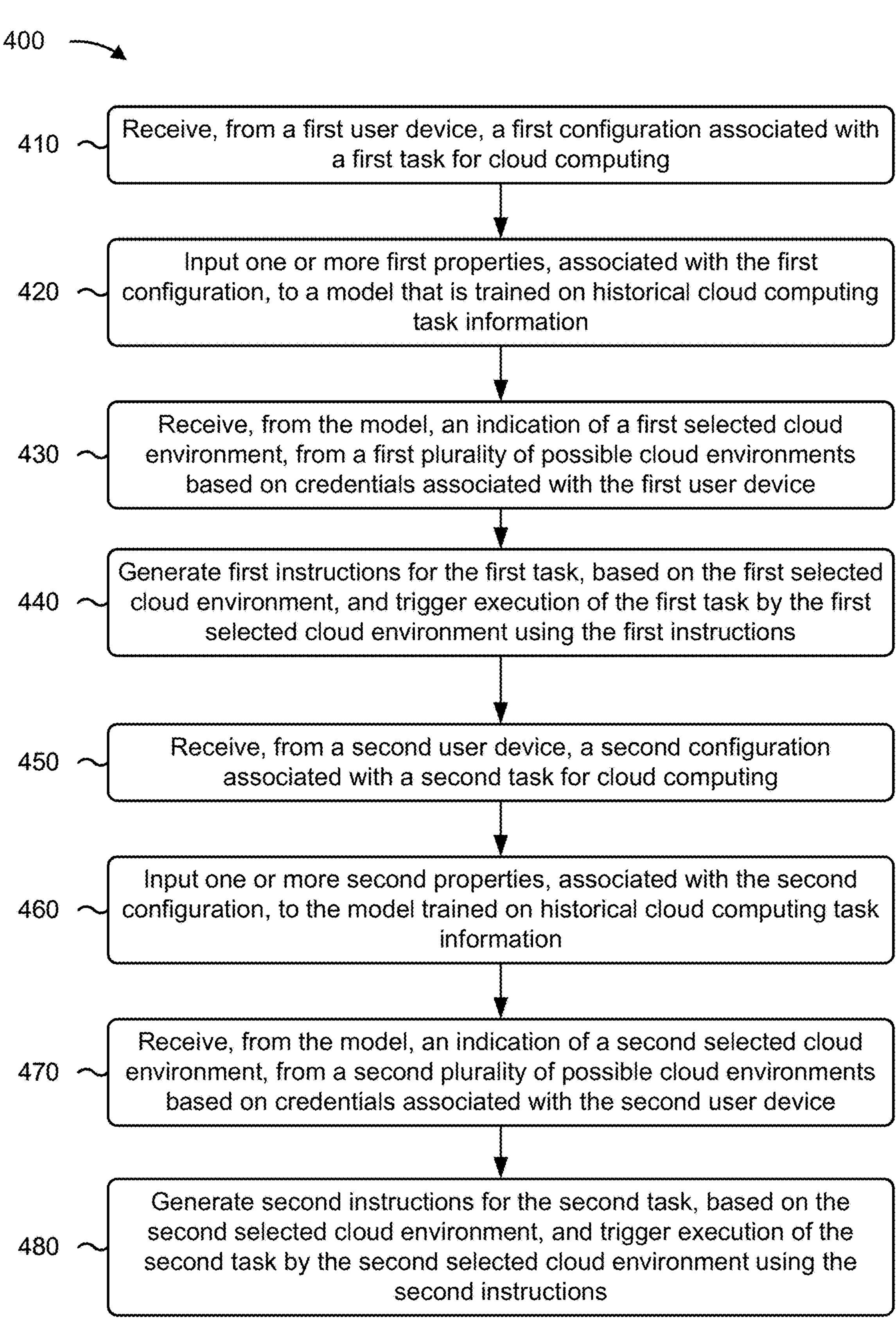
FIG. 4 is a flowchart of an example process relating to managing and securing cloud computing tasks for multiple tenants, in accordance with some embodiments of the present disclosure.

FIG. 4 is a flowchart of an example process 400 associated with managing and securing cloud computing tasks for multiple tenants. In some implementations, one or more process blocks of FIG. 4 may be performed by the cloud management device 230. In some implementations, one or more process blocks of FIG. 4 may be performed by another device or a group of devices separate from or including the cloud management device 230, such as the user device(s) 240, a device implementing the cloud environment database 250, and/or cloud computing environment(s) 201. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving, from a first user device, a first configuration associated with a first task for cloud computing (block 410). For example, the cloud management device 230 (e.g., using processor 320, memory 330, input component 340, and/or communication component 360) may receive, from a first user device, a first configuration associated with a first task for cloud computing, as described above in connection with reference number 105 of FIG. 1A. As an example, a first user of the first user device may access a shell and enter commands to the shell in order to submit the first configuration as a parameter during a call to an API associated with the cloud management device 230. The first configuration may include a package of code associated with the first task and an indication of dependencies associated with the first task.

As further shown in FIG. 4, process 400 may include inputting one or more first properties, associated with the first configuration, to a model, wherein the model is trained on historical cloud computing task information (block 420). For example, the cloud management device 230 (e.g., using processor 320 and/or memory 330) may input one or more first properties, associated with the first configuration, to a model, wherein the model is trained on historical cloud computing task information, as described above in connection with reference number 120 of FIG. 1A. The first properties associated with the first task (e.g., and determined from the first configuration) may include a data size associated with the first task, a computation speed associated with the first task, a programming language associated with the first task, and/or a type of virtualization associated with the first task, among other examples. The historical cloud computing task information may include a plurality of costs associated with a plurality of tasks. Accordingly, the model may be trained to minimize (at least locally) a cost associated with a cloud computing task based on properties associated with the task.

As further shown in FIG. 4, process 400 may include receiving, from the model, an indication of a first selected cloud environment, from a first plurality of possible cloud environments based on credentials associated with the first user device (block 430). For example, the cloud management device 230 (e.g., using processor 320, memory 330, input component 340, and/or communication component 360) may receive, from the model, an indication of a first selected cloud environment, from a first plurality of possible cloud environments based on credentials associated with the first user device, as described above in connection with reference number 120 of FIG. 1A. As an example, the model may output the indication of the first selected cloud environment directly. Alternatively, the cloud management device may transmit, to the first user device, an indication of a set of recommended cloud environments (e.g., output by the model) and receive, from the first user device, an indication of the first selected cloud environment out of the set of recommended cloud environments.

As further shown in FIG. 4, process 400 may include generating first instructions for the first task based on the first selected cloud environment and triggering execution of the first task by the first selected cloud environment using the first instructions (block 440). For example, the cloud management device 230 (e.g., using processor 320 and/or memory 330) may generate first instructions for the first task based on the first selected cloud environment, as described above in connection with reference number 135 of FIG. 1B, and trigger execution of the first task by the first selected cloud environment using the first instructions, as described above in connection with reference number 140 of FIG. 1B. As an example, the cloud management device may transmit the first instructions to the first selected cloud environment. In some implementations, the cloud management device may transmit (with, or before, the first instructions) credentials, associated with the first user device and associated with the first selected cloud environment, to the first selected cloud environment.

As further shown in FIG. 4, process 400 may include receiving, from a second user device, a second configuration associated with a second task for cloud computing (block 450). For example, the cloud management device 230 (e.g., using processor 320, memory 330, input component 340, and/or communication component 360) may receive, from a second user device, a second configuration associated with a second task for cloud computing, as described above in connection with reference number 145 of FIG. 1C. As an example, a second user of the second user device may access a shell and enter commands to the shell in order to submit the second configuration as a parameter during a call to the API associated with the cloud management device 230. The second configuration may include a package of code associated with the second task and an indication of dependencies associated with the second task.

As further shown in FIG. 4, process 400 may include inputting one or more second properties, associated with the second configuration, to the model trained on historical cloud computing task information (block 460). For example, the cloud management device 230 (e.g., using processor 320 and/or memory 330) may input one or more second properties, associated with the second configuration, to the model trained on historical cloud computing task information, as described above in connection with reference number 160 of FIG. 1C. The second properties associated with the second task (e.g., and determined from the second configuration) may include a data size associated with the second task, a computation speed associated with the second task, a programming language associated with the second task, and/or a type of virtualization associated with the second task, among other examples. The historical cloud computing task information may include a plurality of costs associated with a plurality of tasks. Accordingly, the model may be trained to minimize (at least locally) a cost associated with a cloud computing task based on properties associated with the task.

As further shown in FIG. 4, process 400 may include receiving, from the model, an indication of a second selected cloud environment, from a second plurality of possible cloud environments based on credentials associated with the second user device (block 470). For example, the cloud management device 230 (e.g., using processor 320, memory 330, input component 340, and/or communication component 360) may receive, from the model, an indication of a second selected cloud environment, from a second plurality of possible cloud environments based on credentials associated with the second user device, as described above in connection with reference number 160 of FIG. 1C. As an example, the model may output the indication of the second selected cloud environment directly. Alternatively, the cloud management device may transmit, to the second user device, an indication of a set of recommended cloud environments (e.g., output by the model) and receive, from the second user device, an indication of the second selected cloud environment out of the set of recommended cloud environments.

As further shown in FIG. 4, process 400 may include generating second instructions for the second task based on the second selected cloud environment and triggering execution of the second task by the second selected cloud environment using the second instructions (block 480). For example, the cloud management device 230 (e.g., using processor 320 and/or memory 330) may generate second instructions for the second task based on the second selected cloud environment, as described above in connection with reference number 175 of FIG. 1D, and trigger execution of the second task by the second selected cloud environment using the second instructions, as described above in connection with reference number 180 of FIG. 1D. As an example, the cloud management device may transmit the second instructions to the second selected cloud environment. In some implementations, the cloud management device may transmit (with, or before, the second instructions) credentials, associated with the second user device and associated with the second selected cloud environment, to the second selected cloud environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for cloud computing task management, the system comprising:

one or more memories; and one or more processors, communicatively coupled to the one or more memories, configured to:

establish a first secure connection with a first user device based on a first key;

receive, from the first user device and via the first secure connection, a first configuration associated with a first task for cloud computing;

input one or more first properties, associated with the first configuration, to a model, wherein the model is trained on historical cloud computing task information;

receive, from the model, an indication of a first selected cloud environment, from a first plurality of possible cloud environments based on credentials associated with the first user device;

generate first instructions for the first task based on the first selected cloud environment;

trigger execution of the first task by the first selected cloud environment using the first instructions;

transmit, to the first user device, a status indication associated with execution of the first task;

establish a second secure connection with a second user device based on a second key, wherein the second secure connection is different from the first secure connection;

receive, from the second user device and via the second secure connection, a second configuration associated with a second task for cloud computing, wherein the second configuration comprises an indication of dependencies associated with the second task;

input one or more second properties, associated with the second configuration, to the model trained on historical cloud computing task information, wherein the historical cloud computing task information includes task information from a preconfigured duration, wherein after the preconfigured duration has passed, an original historical cloud computing task information is replaced with a recent historical cloud computing task information based on the preconfigured duration, and wherein the model is re-trained on the recent historical cloud computing task information after the preconfigured duration has passed;

receive, from the model, an indication of a second selected cloud environment, from a second plurality of possible cloud environments based on credentials associated with the second user device;

generate second instructions for the second task based on the second selected cloud environment; and trigger execution of the second task by the second selected cloud environment using the second instructions.

2. The system of claim 1, wherein the one or more processors, to trigger execution of the first task, are configured to:

transmit the credentials associated with the first user device to the first selected cloud environment; and transmit the first instructions to the first selected cloud environment.

3. The system of claim 1, wherein the one or more processors, to establish the first secure connection, are configured to:

receive, from the first user device, credentials associated with the system.

4. The system of claim 1, wherein the one or more processors are further configured to:

receive, from the first user device, a first registration message including the credentials associated with the first user device; and receive, from the second user device, a second registration message including the credentials associated with the second user device.

5. The system of claim 1, wherein the first secure connection and the second secure connection are established based on credentials associated with the cloud environment.

6. A method of cloud computing task management, comprising:

establishing a first secure connection with a user device based on a first key;

receiving, from the user device and via the first secure connection, a configuration associated with a task for cloud computing;

inputting one or more properties, associated with the configuration, to a model, wherein the model is trained on historical cloud computing task information;

receiving, from the model, an indication of a selected cloud environment, from a plurality of possible cloud environments based on credentials associated with the user device;

generating instructions for the task based on the indication of the selected cloud environment;

triggering execution of the task by the selected cloud environment using the instructions;

transmitting, to the user device, a status indication associated with execution of the task;

establishing a second secure connection with another user device based on a second key, wherein the second secure connection is different from the first secure connection;

receiving, from the other user device and via the second secure connection, another configuration associated with another task for cloud computing, wherein the other configuration comprises an indication of dependencies associated with the other task;

inputting one or more other properties, associated with the other configuration, to the model trained on the historical cloud computing task information, wherein the historical cloud computing task information includes task information from a preconfigured duration, wherein after the preconfigured duration has passed, an original historical cloud computing task information is replaced with a recent historical cloud computing task information based on the preconfigured duration, and wherein the model is re-trained on the recent historical cloud computing task information after the preconfigured duration has passed;

receiving, from the model, an indication of another selected cloud environment;

generating other instructions for the other task based on the other selected cloud environment; and triggering execution of the other task by the other selected cloud environment using the other instructions.

7. The method of claim 6, wherein the historical cloud computing task information comprises a plurality of costs associated with a plurality of tasks.

8. The method of claim 6, wherein receiving the configuration comprises:

receiving, at an application programming interface, a package of code associated with the task and an indication of one or more dependencies associated with the task.

9. The method of claim 6, further comprising: transmitting, to the user device, an indication of one or more recommended cloud environments from the model; and receiving, from the user device, an indication of the selected cloud environment from the one or more recommended cloud environments.

10. The method of claim 6, wherein the model is trained on historical cloud computing task information associated with the user device.

11. The method of claim 6, wherein the model is trained on anonymized historical cloud computing task information associated with a plurality of users.

12. The method of claim 6, wherein the selected cloud environment comprises a distributed computing platform executed on a single node.

13. The method of claim 6, wherein the first secure connection and the second secure connection are established based on credentials associated with the cloud environment.

14. A non-transitory computer-readable medium storing a set of instructions for cloud computing task management, the set of instructions comprising:

one or more instructions that, when executed by one or more processors of a device, cause the device to:

establish a first secure connection with a first user device based on a first key;

receive, from the first user device and via the first secure connection, a first configuration associated with a first task for cloud computing;

input one or more first properties, associated with the first configuration, to a model, wherein the model is trained on historical cloud computing task information;

determine a first selected cloud environment;

generate first instructions for the first task based on the first selected cloud environment;

transmit, to the first user device, a status indication associated with execution of the first task;

trigger execution of the first task by the first selected cloud environment using the first instructions;

establish a second secure connection with a second user device based on a second key, wherein the second secure connection is different from the first secure connection;

receive, from the second user device and via the second secure connection, a second configuration associated with a second task for cloud computing, wherein the second configuration comprises an indication of dependencies associated with the second task;

input one or more second properties, associated with the second configuration, to the model trained on historical cloud computing task information, wherein the historical cloud computing task information includes task information from a preconfigured duration, wherein after the preconfigured duration has passed, an original historical cloud computing task information is replaced with a recent historical cloud computing task information based on the preconfigured duration, and wherein the model is re-trained on the recent historical cloud computing task information after the preconfigured duration has passed;

determine a second selected cloud environment, wherein the second selected cloud environment comprises a distributed computing platform executed on a single node;

generate second instructions for the second task based on the second selected cloud environment; and trigger execution of the second task by the second selected cloud environment using the second instructions.

15. The non-transitory computer-readable medium of claim 14, wherein the one or more instructions, that cause the device to determine the first selected cloud environment, cause the device to:

transmit, to the first user device, an indication of one or more first recommended cloud environments from a model; and receive, from the first user device, an indication of the first selected cloud environment from the one or more first recommended cloud environments.

16. The non-transitory computer-readable medium of claim 14, wherein the one or more instructions, that cause the device to determine the second selected cloud environment, cause the device to:

receive, from a model, an indication of the second selected cloud environment.

17. The non-transitory computer-readable medium of claim 14, wherein the one or more instructions, when executed by the one or more processors, further cause the device to:

transmit, to the first user device, a status indication associated with execution of the first task; and transmit, to the second user device, a status indication associated with execution of the second task.

18. The non-transitory computer-readable medium of claim 14, wherein the first instructions are stored in a first storage that is separate from a second storage having the second instructions.

19. The non-transitory computer-readable medium of claim 14, wherein the first configuration is stored in a first storage that is separate from a second storage having the second configuration.

20. The non-transitory computer-readable medium of claim 14, wherein the one or more instructions, that cause the device to generate the second instructions for the second task, cause the device to:

generate the second instructions with at least one field including a null value.

* * * * *